(12) United States Patent
Janchookiat

(10) Patent No.: US 10,127,799 B2
(45) Date of Patent: *Nov. 13, 2018

(54) METHODS, SYSTEMS, AND DEVICES FOR MANAGING, REPRIORITIZING, AND SUPPRESSING INITIATED ALARMS

(71) Applicant: THAI OIL PUBLIC COMPANY LIMITED, Bangkok (TH)

(72) Inventor: Mongkol Janchookiat, Bangkok (TH)

(73) Assignee: Thai Oil Public Company Limited, Bangkok (TH)

( * ) Notice: Subject to any disclaimer, the term of this patent is extended or adjusted under 35 U.S.C. 154(b) by 0 days.

This patent is subject to a terminal disclaimer.

(21) Appl. No.: 15/641,135

(22) Filed: Jul. 3, 2017

(65) Prior Publication Data

US 2017/0301225 A1    Oct. 19, 2017

Related U.S. Application Data

(60) Continuation of application No. 15/367,131, filed on Dec. 1, 2016, now Pat. No. 9,697,722, which is a
(Continued)

(51) Int. Cl.
*G08B 21/00*    (2006.01)
*G08B 29/02*    (2006.01)
(Continued)

(52) U.S. Cl.
CPC ......... *G08B 29/02* (2013.01); *G05B 23/0272* (2013.01); *G06F 11/327* (2013.01);
(Continued)

(58) Field of Classification Search
CPC .............. G05B 23/0272; G06F 11/327; G06F 11/3419; G06F 2201/81; G06F 2201/86;
(Continued)

(56) References Cited

U.S. PATENT DOCUMENTS 5,049,873 A    9/1991    Robins et al.
5,270,947 A *  12/1993   Slocum ................ G05B 19/106
                                              340/521
(Continued)

FOREIGN PATENT DOCUMENTS

| CN | 1522391 | 8/2004 |
|----|---------|--------|
| CN | 102857365 | 1/2013 |
| WO | 2014129983 | 8/2014 |

OTHER PUBLICATIONS

International search report for co-pending PCT application No. PCT/TH2013/000008 dated Dec. 5, 2013.
(Continued)

*Primary Examiner* — Mark Rushing
(74) *Attorney, Agent, or Firm* — Baker & McKenzie LLP

(57) ABSTRACT

Present example embodiments relate generally to methods, systems, devices, computer readable medium, and logic for managing a plurality of alarms initiated by a plurality of alarm sensors. The method may include receiving a plurality of initiated alarm. The method may further include prioritizing one or more of the initiated alarms. The method may further include reprioritizing one or more of the prioritized initiated alarm when the one or more prioritized initiated alarm satisfies a reprioritization condition. The method may further include providing information pertaining to the one or more reprioritized alarms.

26 Claims, 6 Drawing Sheets

Related U.S. Application Data division of application No. 14/442,999, filed as application No. PCT/TH2013/000008 on Feb. 21, 2013, now Pat. No. 9,633,552.

(51) Int. Cl.
| | |
|---|---|
| *H04L 12/24* | (2006.01) |
| *G06F 11/32* | (2006.01) |
| *G05B 23/02* | (2006.01) |
| *G06F 11/34* | (2006.01) |
| *G08B 29/18* | (2006.01) |
| *G08B 25/00* | (2006.01) |

(52) U.S. Cl.
CPC ........ *G06F 11/3419* (2013.01); *G08B 25/001* (2013.01); *G08B 29/185* (2013.01); *H04L 41/0609* (2013.01); *H04L 41/0631* (2013.01); *G06F 2201/81* (2013.01); *G06F 2201/86* (2013.01)

(58) Field of Classification Search
CPC ... G08B 29/02; G08B 29/185; H04L 41/0609; H04L 41/0631
USPC ........................................ 340/511
See application file for complete search history.

(56) References Cited

U.S. PATENT DOCUMENTS

| | | |
|---|---|---|
| 6,492,901 B1 | 12/2002 | Ridolfo |
| 6,774,786 B1 | 8/2004 | Havekost et al. |
| 2002/0147511 A1 | 10/2002 | Eryurek et al. |
| 2005/0083193 A1 | 4/2005 | Al-Ali |
| 2006/0208870 A1 | 9/2006 | Dousson et al. |
| 2007/0222576 A1 | 9/2007 | Miller et al. |
| 2007/0257788 A1 | 11/2007 | Carlson et al. |
| 2009/0088606 A1 | 4/2009 | Cuddihy et al. |
| 2009/0212943 A1 | 8/2009 | Burnard et al. |
| 2010/0211192 A1 | 8/2010 | Stluka et al. |

OTHER PUBLICATIONS

Written opinion of the International Searching Authority for co-pending PCT application No. PCT/TH2013/000008 dated Dec. 5, 2013.

International preliminary report on patentability from corresponding PCT/TH2013/000008.

U.S. Appl. No. 15/367,131 by Janchookiat, filed Dec. 1, 2016 entitled "Methods, systems, and devices for managing a plurality of alarms".

U.S. Appl. No. 14/442,999 by Janchookiat, filed May 14, 2015 entitled "Methods, systems, and devices for managing, reprioritizing, and suppressing initiated alarms".

\* cited by examiner

METHODS, SYSTEMS, AND DEVICES FOR MANAGING, REPRIORITIZING, AND SUPPRESSING INITIATED ALARMS

CROSS-REFERENCE TO RELATED APPLICATIONS

This application is a continuation of U.S. application Ser. No. 15/367,131 (filed on Dec. 1, 2016, which is a divisional of U.S. application Ser. No. 14/442,999 filed May 14, 2015, which is a U.S. National Stage Application which claims benefit of Patent Cooperation Treaty Application No. PCT/TH2013/000008TH filed Feb. 21, 2013), the contents of all of which are hereby expressly incorporated by reference in their entirety, including the contents and teachings of any references contained therein.

TECHNICAL FIELD

The present disclosure relates generally to systems, methods, devices, computer-readable medium, and logic for managing a plurality of alarms initiated by a plurality of alarm sensors in an alarm-based environment.

BACKGROUND

Distributed Control Systems ("DCS systems") enable an organization to perform remote centralized controlling of various assets, processes, and alarm-related functions in an alarm-based environment. It is recognized herein that DCS systems available today, however, are highly complex and inflexible systems, making it generally difficult for operators to readily and sufficiently obtain information pertaining to understanding alarms, suppressing initiated alarms, identifying causes that initiate alarms, and/or resolving problems associated with initiated alarms.

Due to inherent limitations of conventional DCS systems, separate alarm management systems are typically implemented with DCS systems. For example, an alarm management system may operate as a standalone system and/or a connected system. In an example standalone system, an alarm management terminal is placed physically alongside a DCS terminal, which enables an operator to search the alarm management system to learn more about alarms displayed on the DCS terminal. In an example connected system, an alarm management terminal is typically serially connected to an adjacent DCS terminal so as to pull/retrieve/mirror alarms that are received/displayed by the DCS terminal. In these conventional approaches, however, the correct, effective, and timely configuring of alarms, understanding of alarms, suppressing of alarms, and identifying and resolving the cause(s) that initiate alarms generally lies in whole or in large with the experience, skills, and know-how of the specific operator(s) and/or operator team working at that time. It is recognized herein that problems not only arise from the actual root causes/bad actors of alarms initiated in an alarm-based environment, but also from the inherent variations in, among other things, performing correct, effective, and timely configuring, understanding, approaching, solving, and minimizing overall consequences caused by the problems that initiate the alarms, which in turn is a direct consequence of operator experience, skill, and know-how within and between organizations.

Furthermore, it is recognized herein that organizations often encounter problems in respect to determining an overall performance level of their DCS and/or alarm management system. For example, it is often difficult or impossible to accurately, effectively, and quickly determine an overall performance of the DCS and/or alarm system for one or more time periods and/or after a substantive event. A substantive event may include an upgrade or replacement of a DCS and/or alarm management system, and/or implementing a new or revised alarm management philosophy, alarm prioritization matrix, and/or industry standard. In practice, conventional approaches will be directed to formulating and testing specific test scenarios of certain known aspects, including those that are affected by a substantive event. Problems arise, however, due to the inability for such conventional approaches to determine an overall performance of the system, and/or how an overall performance of the system during one time period (or by one operator or group of operators) compares to an overall performance of the system during another time period (or by another operator or another group of operators).

SUMMARY

Present example embodiments relate generally to systems, methods, devices, computer readable medium, and logic pertaining to improving the managing of a plurality of alarms.

In an exemplary embodiment, a method is described for managing a plurality of alarms. The method may include receiving a plurality of initiated alarm. The method may further include prioritizing one or more of the initiated alarms. The method may further include reprioritizing one or more of the prioritized initiated alarm when the one or more prioritized initiated alarm satisfies a reprioritization condition. The method may further include providing information pertaining to the one or more reprioritized alarms.

In another exemplary embodiment, a system is described for managing a plurality of alarms. The system may include a network, a graphical display, an interface operable to receive signals representing initiated alarms, a storage device, and a processor. The storage device may include a database, the database configurable to store alarm information. The processor may be in communication with the graphical display, the interface, the storage device, and the network. The processor may be configurable to receive a plurality of initiated alarm. The processor may also be configurable to prioritize one or more of the initiated alarms. The processor may also be configurable to reprioritize one or more of the prioritized initiated alarm when the one or more prioritized initiated alarms satisfies a reprioritization condition. The processor may also be configurable to display, on the graphical display, and one or more of the reprioritized alarms.

In another exemplary embodiment, logic is described for managing a plurality of alarms. The logic may be embodied in a non-transitory computer-readable medium and, when executed, operable to cause a computing device to receive a plurality of initiated alarm. The logic may also be operable to cause the computing device to prioritize one or more of the initiated alarms. The logic may also be operable to cause the computing device to reprioritize one or more of the prioritized initiated alarm when the one or more prioritized initiated alarm satisfies a reprioritization condition. The logic may also be operable to cause the computing device to provide information pertaining to the one or more reprioritized alarms.

In another exemplary embodiment, a method is described for managing a plurality of alarms initiated by a plurality of alarm sensors. The method comprises receiving the plurality of initiated alarm. The method further comprises prioritizing the initiated alarms. The method further comprises creating an initiated alarm being a condition-based alarm when an initiated alarm satisfies an event condition. The method further comprises reprioritizing an initiated alarm when said initiated alarm satisfies a reprioritization condition. The method further comprises suppressing an initiated alarm. The method further comprises reporting an unsuppressed initiated alarm based on the prioritizing of said alarm. The method further comprises providing information comprising an operator action for the unsuppressed initiated alarm and an initiated alarm suppressed based on the unsuppressed initiated alarm.

In another exemplary embodiment, a system is provided managing a plurality of alarms initiated by a plurality of alarm sensors, the system comprising: a network; a graphical display; an interface operable to receive signals representing initiated alarms; a storage device comprising a database, the database configurable to store information comprising alarm information, an alarm prioritization matrix, and an initiated alarm received by the interface; a processor in communication with the graphical display, the interface, the storage device, and the network, the processor operable to: receive the plurality of initiated alarm; prioritize the initiated alarms; create an initiated alarm being a condition-based alarm when an initiated alarm satisfies an event condition; reprioritize an initiated alarm when said initiated alarm satisfies a reprioritization condition; suppress an initiated alarm; display, on the graphical display, an unsuppressed initiated alarm based on the prioritizing of said alarm; and provide information comprising an operator action for the unsuppressed initiated alarm and an initiated alarm suppressed based on the unsuppressed initiated alarm.

In another exemplary embodiment, a computing device is provided for managing a plurality of alarms initiated by a plurality of alarm sensors, the computing device in communication with a network and a storage device comprising a database, wherein the database is configurable to store information comprising alarm information, an alarm prioritization matrix, and an initiated alarm, the computing device comprising: a graphical display; an interface operable to receive signals representing initiated alarms; and a processor in communication with the graphical display and the interface, the processor operable to: receive the plurality of initiated alarm; prioritize the initiated alarms; create an initiated alarm being a condition-based alarm when an initiated alarm satisfies an event condition; reprioritize an initiated alarm when said initiated alarm satisfies a reprioritization condition; suppress an initiated alarm; display, on the graphical display, an unsuppressed initiated alarm based on the prioritizing of said alarm; and provide information comprising an operator action for the unsuppressed initiated alarm and an initiated alarm suppressed based on the unsuppressed initiated alarm.

In another exemplary embodiment, logic for managing a plurality of alarms initiated by a plurality of alarm sensors is provided. The logic is embodied in a non-transitory computer-readable medium and, when executed, operable to cause a computing device to perform the steps of: prioritizing the plurality of initiated alarms; creating an initiated alarm being a condition-based alarm when an initiated alarm satisfies an event condition; reprioritizing an initiated alarm when said initiated alarm satisfies a reprioritization condition; suppressing an initiated alarm; displaying, on a graphical display in communication with the computing device, an unsuppressed initiated alarm based on the prioritizing of said alarm; and providing information comprising an operator action for the unsuppressed initiated alarm and an initiated alarm suppressed based on the unsuppressed initiated alarm.

In another exemplary embodiment, a computing device is provided for managing a plurality of alarms initiated by a plurality of alarm sensors, the computing device comprising: a graphical display; an interface in communication with a network; and a processor operable to receive information comprising an unsuppressed initiated alarm, an operator action for the unsuppressed initiated alarm, and an initiated alarm suppressed based on the unsuppressed initiated alarm; wherein the processor is further operable to display the received information on the graphical display.

In another exemplary embodiment, a method is provided for managing a plurality of alarms initiated by a plurality of alarm sensors, the method comprising: receiving the plurality of initiated alarm; prioritizing the initiated alarms; identifying a trigger alarm, wherein the trigger alarm is an alarm associated with a subsequently initiated alarm; retrieving a set of expected alarms, the set of expected alarms comprising an alarm expected to be initiated subsequent to the trigger alarm; identifying a set of triggered alarms, the set of triggered alarms comprising an alarm occurring subsequent to the trigger alarm and matching an alarm in the set of expected alarms; identifying a set of untriggered alarms, the set of untriggered alarms comprising an alarm matching an alarm in the set of expected alarms and not received subsequent to the trigger alarm; suppressing an initiated alarm when said alarm matches an alarm identified in the set of triggered alarms; reporting the trigger alarm; reporting a fault alarm when an initiated alarm matches an alarm identified in the set of untriggered alarms; and providing information comprising an operator action for the trigger alarm and an initiated alarm suppressed based on the trigger alarm.

In another exemplary embodiment, a method is provided for managing a plurality of alarms initiated by a plurality of alarm sensors, the method comprising: establishing an alarm policy based on at least an industry standard pertaining to alarm management practices; configuring a prioritization procedure for prioritizing an alarm from among the plurality of alarms based on the alarm prioritization matrix; assigning a priority for an alarm from among the plurality of alarms based on a limit setting for the alarm and the prioritization procedure, and storing the assigned priority in a database; a reprioritization procedure for dynamically changing a limit setting for an alarm from among the plurality of alarms based on a reprioritization condition being an operating condition, and prioritizing the alarm based on the dynamically changed limit setting; a static alarm suppression procedure for suppressing an alarm based on a shutdown activity; a dynamic alarm suppression procedure for suppressing an alarm based on a prior initiated alarm; a transitory suppression procedure for suppressing an alarm when said alarm is an alarm operable to be initiated during a transitory event; and a reporting procedure for reporting an unsuppressed initiated alarm; wherein the reporting procedure is further operable to report information comprising an appropriate operator action for the unsuppressed initiated alarm and an initiated alarm suppressed based on the unsuppressed initiated alarm.

In another exemplary embodiment, a method is provided for assessing an overall performance of a system comprising a plurality of alarms initiated by a plurality of alarm sensors. The method comprises determining a first performance level of the system based on a performance matrix and a first set of system measurements. The first set of system measurements comprises a first average alarm rate for a first time period. The first set of system measurements further comprises a first threshold percentage for the first time period, the first threshold percentage being a percentage of time that an average alarm rate is greater than a predetermined threshold alarm rate. The first set of system measurements further comprises a first maximum alarm rate occurring within the first time period. The method further comprises determining a second performance level of the system based on the performance matrix and a second set of system measurements. The second set of system measurements comprises a second average alarm rate for a second time period. The second set of system measurements further comprises a second threshold percentage for the second time period, the second threshold percentage being a percentage of time that an average alarm rate is greater than the predetermined threshold alarm rate. The second set of system measurements further comprises a second maximum alarm rate occurring within the second time period. The method further comprises comparing the first performance level to the second performance level.

BRIEF DESCRIPTION OF THE DRAWINGS

For a more complete understanding of the present disclosure, example embodiments, and their advantages, reference is now made to the following description taken in conjunction with the accompanying drawings, in which like reference numbers indicate like features, and.

Although similar reference numbers may be used to refer to similar elements for convenience, it can be appreciated that each of the various example embodiments may be considered to be distinct variations.

DETAILED DESCRIPTION

Figure 1:
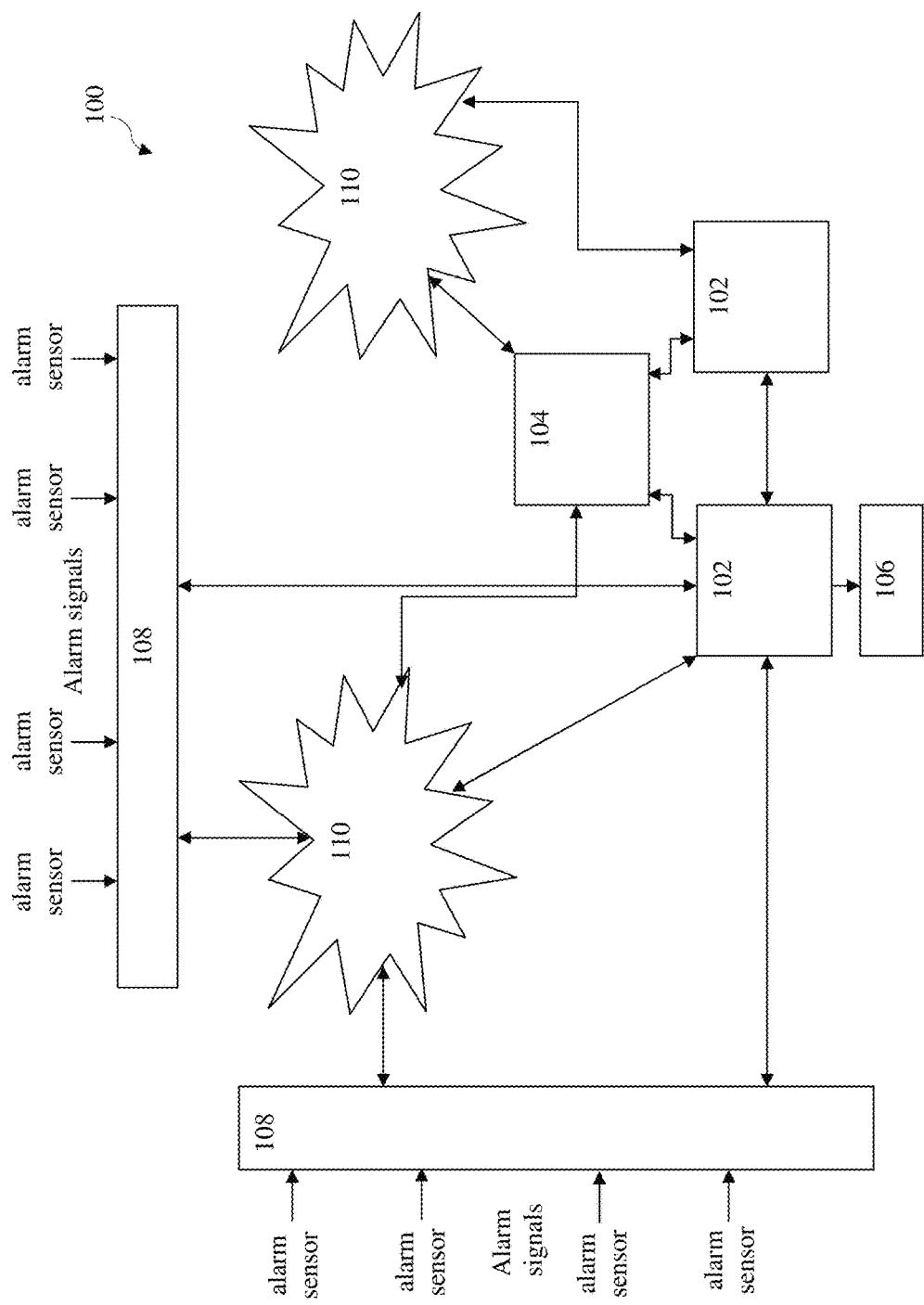
FIG. 1 is an exemplary embodiment of a system for managing a plurality of alarms initiated by a plurality of alarm sensors.

Example embodiments will now be described hereinafter with reference to the accompanying drawings, which form a part hereof, and which illustrate example embodiments which may be practiced. As used in the disclosures and the appended claims, the terms "example embodiment", "exemplary embodiment", and "present embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

It is recognized herein that the accuracy, effectiveness, and speed in managing alarms, including configuring, identifying, understanding, analyzing, assessing, prioritizing, rationalizing, and handling and resolving alarms and the root causes and problems that initiate alarms in an alarm-based environment have been conventionally dependent and limited, in whole or in part, on the experience, skills, and know-how of the specific personnel and/or personnel groups working at any given time (such as a shift), and such can vary tremendously between and even within an organization. The variances in the above may mean the difference between a quick resolution with minimal or no economic loss to potentially losing enormous valuation per unit time (such as per minute) and/or causing personnel injuries, environmental disasters, and even loss of lives.

Present example embodiments relate generally to methods, devices, systems, computer-readable medium, and logic for alarm management, configuring alarm management systems, and determining an overall performance of an alarm management system in an alarm-based environment.

As used herein, "alarm management", "managing alarms", and the like, and the systems, methods, devices, computer-readable medium, and logic thereof, and the like, will refer to example embodiments operable to perform and/or assist personnel in performing managing of alarms and root causes and problems that initiate alarms, and may include those that are standalone systems and/or those that are communicable, either directly or indirectly, to an alarm-related system, such as a DCS system, and alarm-related aspects of an alarm-related system, including those of a DCS system. More specifically, example embodiments are operable to perform one or more of accurately, effectively, and timely configuring, assessing, analyzing, prioritizing, rationalizing, monitoring, and reporting of alarms in an alarm management system. Example embodiments are further operable to enable one or more of a plurality of personnel, including operators, to consistently achieve one or more of accurately, effectively, efficiently, and timely identifying, configuring, assessing, analyzing, understanding, reporting, and handling and resolving situations, including problems indicated by one or a plurality of initiated alarms.

Example embodiments are operable to perform alarm management for one or more of a plurality of alarms, including configured alarms, initiated alarms, triggered alarms, dynamically-created alarms, reprioritizable alarms, condition-based or conditional alarms, suppressed alarms, bad actor alarms, fleeting or repeated alarms, standing alarms, group alarms, transient alarms, acknowledged alarms, delayed alarms, malfunctioning alarms, pre-alarms, and alarms that fail to initiate, trigger or be triggered, create, reprioritize, suppress, delay, and/or acknowledge. As used herein, an "initiated alarm" may include one or more alarms, including those generally known by persons of ordinary skill in the art, that have been identified by a sensor and/or a computing device to meet one or more set limits and/or conditions. In example embodiments, an initiated alarm may include one or more of: a configured alarm that has been initiated; a trigger alarm, which may include an alarm that is associated with and/or triggers one or more subsequently initiated alarms; a triggered alarm, which may include an alarm that has been subsequently initiated and/or triggered by a trigger alarm; a dynamically-created alarm, which may include an alarm that becomes initiated based on one or more conditions, such as a predetermined condition, an operating condition, and/or another initiated alarm; a reprioritizable alarm, which may include an alarm that can be assigned a priority based on satisfying one or more conditions, such as a reprioritization condition, and/or an alarm whose one or more limit settings can be changed based on satisfying one or more conditions, such as a reprioritization condition; a condition-based alarm, which may include an alarm that becomes initiated based on one or more other initiated alarms and/or one or more conditions, such as an event condition; an alarm prior to being suppressed by one or more suppression methods or procedures (to be described herein); a bad actor alarm; a pareto alarm; a fleeting alarm, which may include an alarm that initiates and clears (and/or return to an non-initiated state without being acknowledged) over a period of time; a standing alarm; a group alarm, which may include an initiated alarm comprising two or more related alarms that have, among other things, substantially the same priority and/or required action and/or response by an operator; a grouped alarm, which may include an alarm in a group alarm; a transient alarm, which may include an alarm initiated during a transitory period; an acknowledged alarm, which may include an alarm initiated and acknowledged by an operator; a delayed alarm; and an alarm that, but for a failure to initiate and/or be received by the system (such as by an alarm processor), would have initiated or been received. For example, a temperature sensor having a high limit setting of 100 degrees Celsius and a low limit setting of 10 degrees Celsius would normally initiate a high temperature high alarm when the sensor measures a temperature equal to or greater than 100 degrees Celsius and likewise should initiate a low temperature high alarm when measuring less than or equal to 0 degrees Celsius.

Configuring an Alarm Management System

Figure 4:
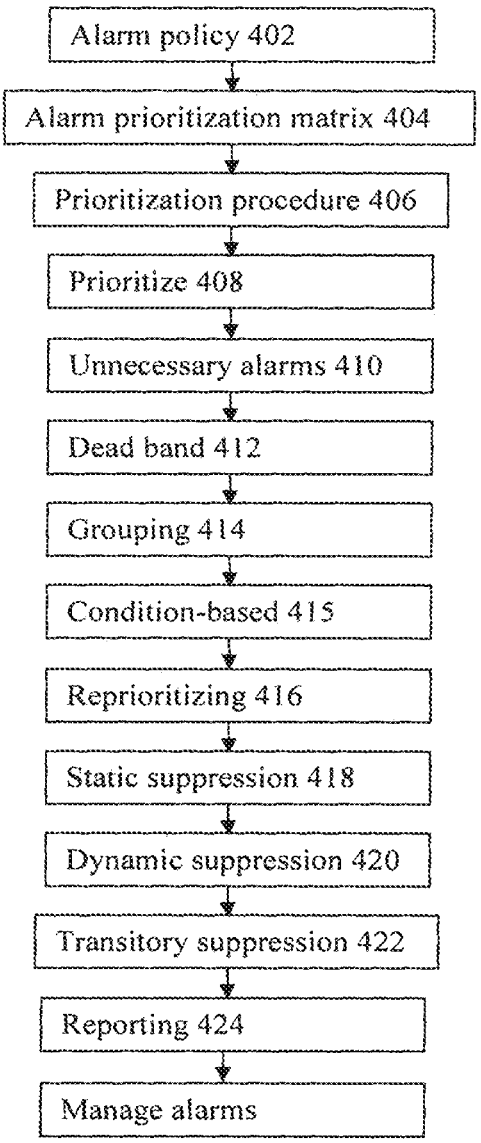
FIG. 4 is an exemplary embodiment of a method of configuring a system comprising a plurality of alarms initiated by a plurality of alarm sensors.

As illustrated in FIG. 4, a method is described for configuring, re-configuring, revising, amending, updating, creating, and/or upgrading an alarm management system, the alarm management system being operable to, among other things, manage a plurality of alarms, including alarms initiated by a plurality of alarm sensors in an alarm-based environment.

An example method for managing a plurality of alarms initiated by a plurality of alarm sensors comprises establishing an alarm policy 402 based on at least an industry standard pertaining to alarm management practices. Examples of an industry standard may include the EEMUA Publication No. 191 and the ANSI/ISA 18.2. The method may further comprise configuring an alarm prioritization matrix 404 based on the alarm policy. The method may further comprise configuring a prioritization procedure 406 for prioritizing an alarm from among the plurality of alarms based on the alarm prioritization matrix. The method may further comprise assigning a priority 408 for an alarm from among the plurality of alarms based on a limit setting for the alarm and the prioritization procedure, and storing the assigned priority in a database (not shown). The method may further comprise removing an alarm 410 from among the plurality of alarms identified by the alarm policy as being unnecessary. The method may further comprise reconfiguring a dead band value 412 for an alarm from among the plurality of alarms based on a measurement response time associated with the alarm and the alarm policy. The method may further comprise a grouping procedure 414 comprising creating a new alarm being a group alarm when there are at least two related alarms. In this respect, the related alarms may comprise a same priority and a same initial operator response. The method may further comprise a reprioritization procedure 416 for dynamically changing a limit setting for an alarm from among the plurality of alarms based on a reprioritization condition being an operating condition, and prioritizing the alarm based on the dynamically changed limit setting. The method may further comprise an alarm suppression method 418, such as an example embodiment of a static suppression method, for suppressing an alarm from among the plurality of alarms based on a shutdown activity. The shutdown activity may be a known or planned shutdown activity, and may include an entire plant shutdown, a partial plant shutdown, one or more process or line shutdowns, one or more equipment shutdowns, and/or parts thereof. The method may further comprise an alarm suppression method 420, such as an example embodiment of a dynamic suppression method, for suppressing an alarm from among the plurality of alarms based on the alarm being initiated and/or triggerable by another initiated alarm. The method may further comprise a suppression method 422, such as an example embodiment of a transitory suppression method, for suppressing an alarm from among the plurality of alarms when the alarm is an alarm that is capable of being initiated during a transitory event. The method may further comprise a reporting procedure 424 for reporting, among other things, unsuppressed initiated alarms. In this regard, the reporting procedure 424 may further be operable to report, among other things, information comprising an appropriate operator action for the unsuppressed initiated alarm and/or an initiated alarm suppressed based on an unsuppressed initiated alarm. One or more of the above may also be based on the alarm policy 402, the prioritization procedure 406, and/or the alarm prioritization matrix 404.

It is to be understood herein that the alarm management system may be a system provided by an alarm management or DCS-related provider, such as a complete system, a standalone system, a modular system, and/or an upgrade/revision thereof. Alternatively or in addition, the alarm management system may be a collection, juxtaposition, and/or cooperation of a plurality of different, independent, related, and/or inter-related systems/technologies/standards from one or more vendors. In any event, example embodiments are operable to perform normalizing of varying alarm signals, formats, standards, priorities, and the like, so as to enable the managing of a plurality of alarms originating from a plurality of different alarm-based systems.

To accurately and effectively configure an alarm management system, example embodiments may be directed to first establishing an alarm management policy 402 for the alarm-based entity. As used herein, the terms "organization" and "alarm-based entity" may refer to an entity comprising an alarm-based environment, such as an organization, a group of organizations, a group of alarms, and/or a subset thereof. For example, the alarm-based entity may include one or more factories, departments, refineries, divisions, collection of related and/or unrelated alarms, geographical areas, and the like.

The alarm policy 402 in example embodiments may comprise one or more of baseline criterion, set(s) of rules, best practices and results, historic practices and results, desired practices and desired results, historic alarms, desired alarms, and/or industry standard(s) so as to achieve or work towards achieving one or more alarm management goals. Goals may include one or more of accurately, effectively, and timely configuring, assessing, analyzing, prioritizing, rationalizing, monitoring, and reporting of alarms, including initiated, triggered, and dynamically-created alarms, in an alarm management system. Goals may further include enabling one or more of a plurality of personnel, including operators, to consistently achieve one or more of accurately, effectively, efficiently, and timely identifying, configuring, assessing, analyzing, understanding, reporting, and handling and resolving situations, including problems indicated by one or a plurality of initiated alarms. The varying degrees of addressing the problems and achieving the goals described herein can mean the difference between a quick resolution with minimal or no economic loss or potentially losing enormous valuation per minute and/or causing personnel injuries, environmental disasters, and even loss of lives.

In an example embodiment, a method for managing a plurality of alarms in an alarm-based entity comprises configuring one or more alarm prioritization matrices 404. An alarm prioritization matrix 404 may be configured based on, among other things, the alarm policy. The alarm prioritization matrix 404 may also be configured based on operating conditions. The purpose of the alarm prioritization matrix 404 is to assist in establishing a prioritization procedure 406 for setting one or more priorities for one or more limit settings of one or more alarms of the alarm management system. That is, once the alarms of the alarm management system have been identified, loaded, and/or established (or existing as default alarms) for the alarm-based entity, one or more alarms may be assigned, initially and/or dynamically, one or more priorities based on one or more of, among other things, one or more limit settings for the alarm (or the alarm sensor), the prioritization procedure 406, the alarm prioritization matrix 404, and the alarm policy 402. In example embodiments, the assigned priority or priorities of each alarm are storable in one or more databases.

The method may further comprise identifying and assessing the necessity 410 of one or more alarms that are capable of being initiated by the alarm management system, including existing alarms, historic alarms, pre-configured, and/or default alarms. In doing so, one or more unnecessary alarms 410, which may include alarms pre-configured and/or default in an alarm management system, may be removed and/or deactivated from the alarm management system so as to avoid future occurrences of insignificant, irrelevant, or unnecessary alarms being initiated. Unnecessary alarms 410 may be identified based on the alarm policy. For example, if an alarm is factory-configured to include high-high, high, low, and low-low alarms but only a high-high alarm is identified as being necessary, the high, low, and low-low alarms should be removed, which may include removing the alarm settings and/or resetting alarm priorities to indicate "no alarm".

Example embodiments further comprise reconfiguring one or more dead band values 412 for one or more alarms. In general, default alarm hysteresis dead band values of one or more measurement instruments for one or more alarms can be changed to desired limit values and/or based on the alarm policy. It is recognized herein that alarm rates in an alarm management system may be reduced by changing such limit values based on, for example, the type of instrument, type of measurement, response time of the measurement, and application thereof, so as not to be too narrow and/or too wide. A dead band having limit values that are too narrow may unduly cause oscillating alarms. On the other hand, limit values that are too wide may keep alarms initiated for an unduly long period of time. It is also recognized herein that, for measurements with a relatively slow response time, such as temperature measurements, a narrow dead band should be applied. On the other hand, for measurements with a relatively fast response time, such as pressure measurements, a wide dead band should be applied.

The configuration method may further comprise one or more grouping procedures 414. In example embodiments, a grouping procedure 414 may comprise creating a new alarm, hereinafter called a group alarm, when two or more related alarms are initiated. Initiated alarms may be related when, for example, the alarms comprise a same priority and/or based on the alarm policy. Initiated alarms may also be related when the alarms comprise a same required action for an operator to perform upon being initiated. For example, one or more alarms may be set to provide an initial operator response, which provides an operator with one or more actions to perform (or not perform) when the alarm is initiated. In example embodiments, when two or more initiated alarms comprise the same priority and the same initial operator response, a group alarm, being an alarm representing the two or more related initiated alarms will be initiated. In this regard, the two or more related initiated alarms may be correspondingly removed, suppressed, and/or delayed from being displayed to the operator. In doing so, the number of initiated alarms displayed to the operator may be substantially reduced in example embodiments.

The configuration method may further comprise one or more condition-based procedures 415. In example embodiments, a condition-based procedure 415 may comprise creating a new alarm, hereinafter called a condition-based alarm, when one or more initiated alarms are identified and one or more conditions, such as an event condition, are satisfied. It is recognized herein that condition-based alarms are operable to determine, among other things, one or more situations that may or may not be monitored, measured, and/or determined accurately or at all by alarm sensors.

One or more reprioritization procedures 416 may also be provided in the configuration method. In an example embodiment, a reprioritization 416 may comprise enabling the alarm management system to dynamically change one or more limit settings of an alarm when one or more conditions, such as a reprioritization condition, are met. In operation, a reprioritization of the alarm may occur since the alarm becomes initiated based on one or more different limit setting. In another example embodiment, the reprioritization 416 comprises enabling the alarm management system to dynamically change one or more priorities of one or more alarms when one or more conditions, such as a reprioritization condition, are met. In operation, a reprioritization of the alarm may occur since the alarm becomes initiated based on one or more different priorities when the limit setting is met. In other example embodiments, the reprioritization 416 may also comprise enabling the alarm management system to dynamically change one or more limit settings and one or more priorities of an alarm when one or more reprioritization conditions are met.

One or more example embodiments of static suppression procedures 418 may also be provided in the configuration method. In operation, a static suppression may comprise suppressing one or more alarms that become initiated when one or more shutdown activities occur and/or based on the alarm policy. In general, a shutdown activity may include a known and/or unknown shutdown of one or more equipment, a group of equipment, an entire process or line, and/or the entire organization. In determining a static suppression procedure 418, example embodiments are operable to identify and associate the one or more alarms that are expected to become initiated when a shutdown activity occurs with the static suppression procedure. In operation, when a shutdown activity is identified, example embodiments are operable to perform the static suppression procedure, which may include suppressing the identified and associated alarms. In doing so, the number of initiated alarms displayed to an operator may be substantially reduced during shutdown activities.

In example embodiments, one or more dynamic suppression procedures 420 may also be provided in the configuration method. In general, an initiated alarm (trigger alarm) oftentimes causes (or triggers) one or more other alarms (triggered alarms) to be subsequently initiated. For example, in a flame failure case for a furnace, a flame failure alarm (trigger alarm) will subsequently cause or trigger one or more triggered alarms, including a low fuel pressure alarm, a low fuel trip alarm, a low furnace outlet temperature alarm, an air fuel ratio alarm, and the like. In example embodiments, a dynamic suppression procedure 420 may comprise suppressing one or more subsequently initiated alarms (triggered alarms) when a trigger alarm is initiated and identified as a trigger alarm. In doing so, the number of initiated alarms displayed to an operator may be substantially reduced in example embodiments.

One or more example embodiments of transitory suppression procedures 422 may also be provided in the configuration method. In general, a transitory event may cause one or more alarms to be initiated. For example, a fuel tank may comprise a low-low alarm, a low alarm, a high alarm, and a high-high alarm. In a cleaning operation, the tank may be required to be emptied and refilled. Such a transitory operation may initiate a low alarm, followed by a low-low alarm, followed a low operation again when being re-filled. Example embodiments are operable to identify and suppress transitory alarms, such as the low alarm in the above example. In doing so, the number of initiated alarms displayed to an operator may be substantially reduced in example embodiments.

In example embodiments, a reporting procedure 424 may also be provided so as to report unsuppressed initiated alarms, such as on a graphical display. The graphical display may include a screen of a computing device, such as a network-connected desktop computer or a mobile device, such as a tablet, a PDA, a mobile phone, or the like. It is recognized herein that displaying mostly or only unsuppressed initiated alarms enables the number of relevant initiated alarms displayed to an operator to be substantially reduced. In example embodiments, the unsuppressed initiated alarms are displayable on the graphical display based on, among other things, the priority of the alarm. The displayed alarms may also be displayed based on other characteristics, including whether the initiated alarm is a process alarm, a diagnostic (or system) alarm, a group alarm, an event alarm, a trigger alarm, a reprioritized alarm, a pre-alarm, and the like. As used herein, a process alarm refers to an alarm pertaining to a problem that may result or has already resulted in consequences to personnel safety, economic loss, and/or environmental loss. On the other hand, a diagnostic alarm refers to an alarm that enables an organization to continue operating in a normal manner and/or having consequences not related to personnel safety, economic loss, and/or environmental loss. As such, in displaying initiated alarms based on, for example, process alarms and diagnostic alarms, plant operators viewing operator terminals of the alarm management system may be shown alarms comprising process alarms (diagnostic alarms suppressed), and system engineers viewing dedicated maintenance terminals of the alarm management system may be shown alarms comprising diagnostic alarms (process alarms suppressed).

In respect to the reporting procedure 424 described above and herein, an operator (or system engineer) is further operable to select an initiated alarm to further identify, configure (or reconfigure), assess, analyze, understand, provide further reporting, reprioritize, group, create new alarms (such as event alarms), and/or handle and/or resolve situations, including problems indicated by the initiated alarm. In example embodiments, the selecting may include using a peripheral input device, such as a mouse or touchpad, to click or double-click on the displayed initiated alarm and/or an icon representing the initiated alarm. The selecting may also include, in embodiments comprising a touchscreen display, touching the displayed initiated alarm and/or an icon representing the initiated alarm. Upon selecting an initiated alarm, a window, such as an alarm narrative window, may be opened to display, among other things, details of the alarm. In example embodiments, the window may display information comprising one or more of the alarm name, associated site/plant/unit/area/panel/equipment/etc., location of the alarm in the organization, map of the location of the alarm, alarm type, alarm limit setting, units of measure, purpose of the alarm, consequence of no operator action, severity, operator response time, required operator action (or initial operator response), priority (or priorities) of the alarm, selected priority or priorities of the alarm 408, safeguards for the alarm (such as pre-alarms and escalation), reprioritization procedures 416 and conditions, static suppression procedures 418 and pertinent shutdown activities, dynamic suppression procedures 420 and other initiated triggered alarms suppressed by the alarm, group or grouped alarm 414 details and conditions, transient suppression procedures 422, condition-based alarm 415 details and conditions, dead band value or values 412, significant operating conditions, delay, auto acknowledge, and the like.

Managing an Alarm Management System

Figure 2:
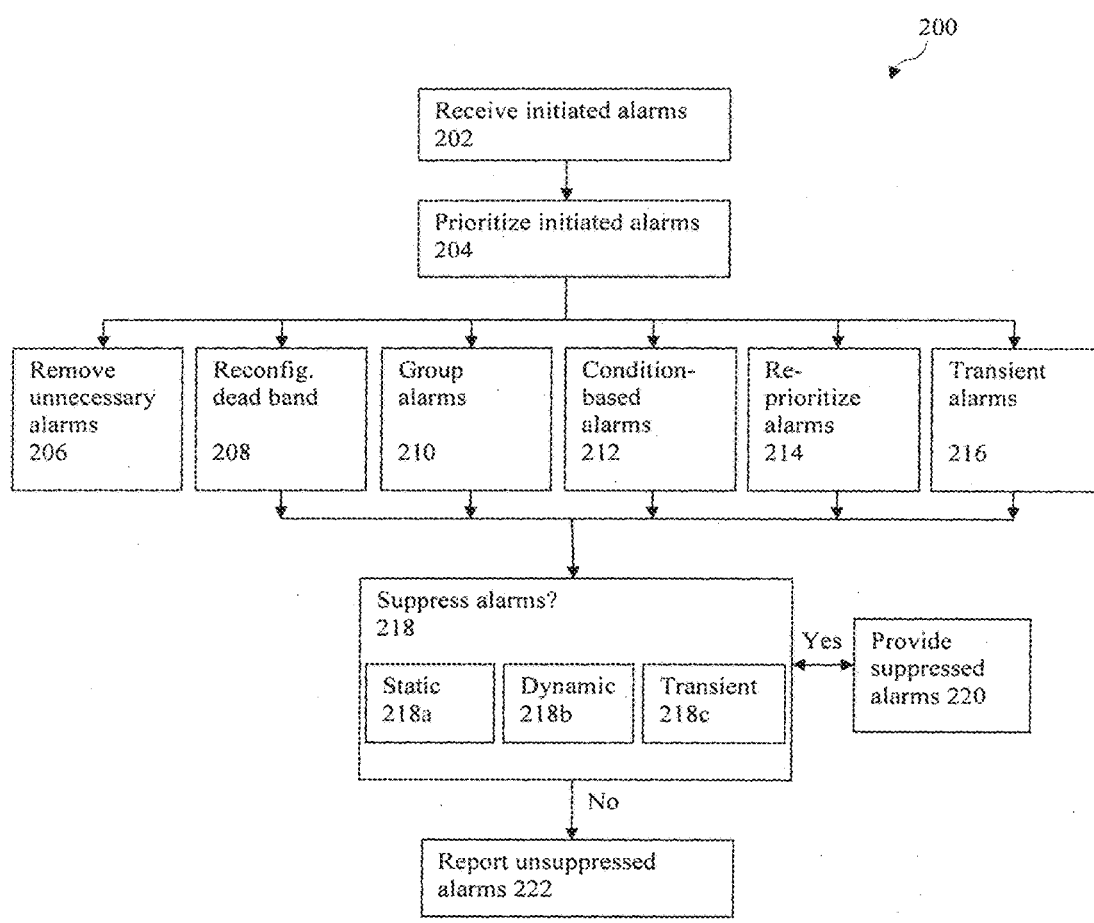
FIG. 2 is an exemplary embodiment of a method for managing a plurality of alarms initiated by a plurality of alarm sensors.
Figure 3:
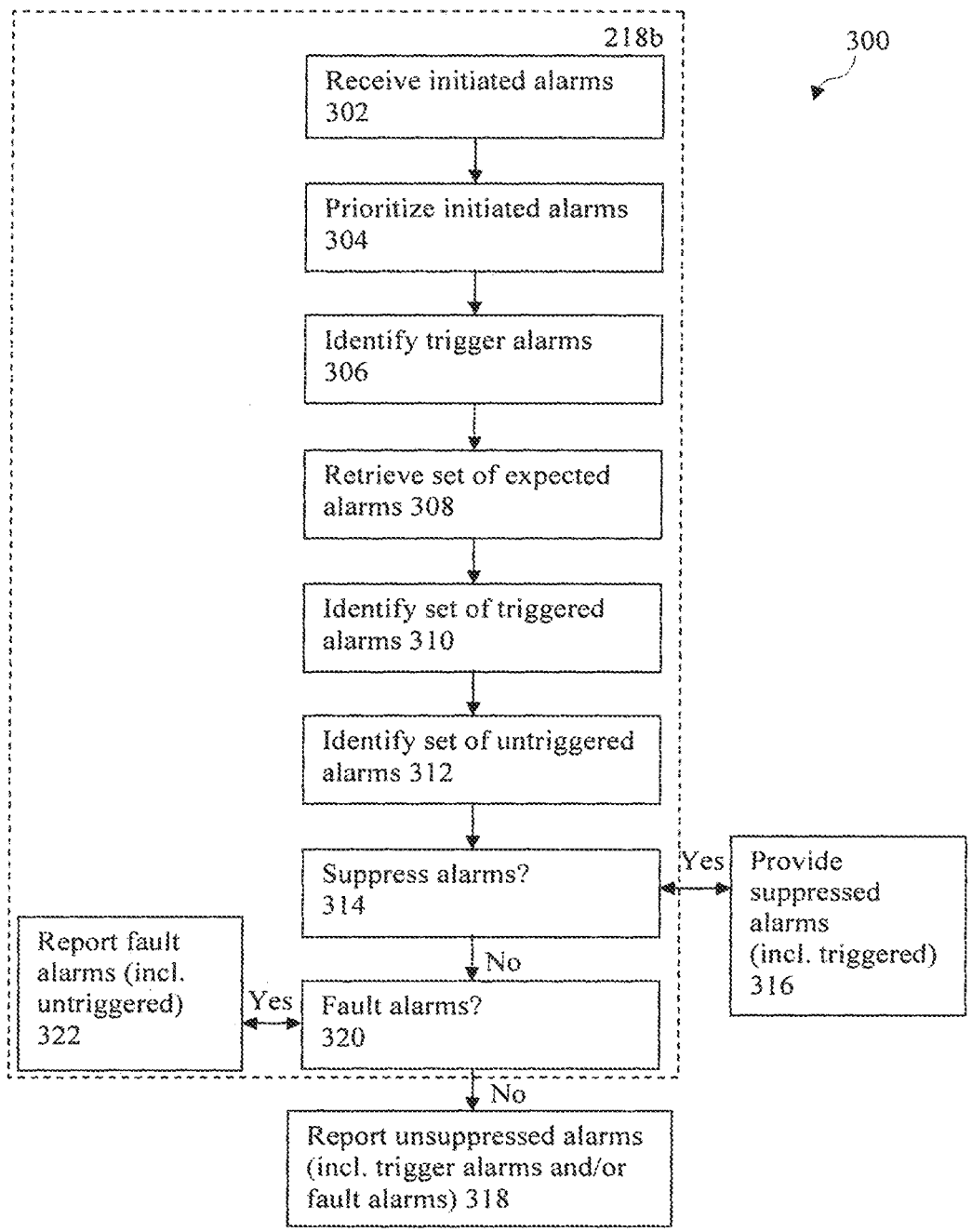
FIG. 3 is an exemplary embodiment of a method for dynamically suppressing alarms.

As illustrated in FIGS. 1-3, methods, systems, devices, and computer-readable medium are described for managing a plurality of alarms in an alarm management system, including alarms initiated by a plurality of alarm sensors in an alarm-based environment. The alarm management system 100 may be configured in accordance with one or more example embodiments of configuring an alarm management system, as described above and herein. Alternatively or in addition, the alarm management system 100 may be configurable at any time, including during factory acceptance testing (FAT), site acceptance testing (SAT), shutdown, low activity periods, managing of alarms, alarm and/or problem handling, during plant upset, during normal plant operation, on the fly, as needed, or the like.

As illustrated in FIG. 2, the method comprises receiving 202 a plurality of initiated alarms. The method may further comprise prioritizing 204 the received initiated alarms. The method may further comprise creating an initiated alarm being a group alarm 210 comprising two or more related initiated alarms. The method may further comprise creating an initiated alarm being a condition-based alarm 212 based on one or more initiated alarms and/or one or more logic conditions. The method may further comprise reprioritizing 214 an initiated alarm based on one or more conditions. The method may further comprise suppressing 218 an initiated alarm from among initiated alarms. The method may further comprise reporting 222 an unsuppressed initiated alarm, and providing information comprising an operator action for the unsuppressed initiated alarm and an initiated alarm suppressed based on the unsuppressed initiated alarm 220.

In operation, example embodiments are operable to receive 202 and prioritize 204 initiated alarms. As illustrated in FIG. 1, the initiated alarms may be receivable 202 by an interface 108 in communication with an alarm management processor 102 operable to receive signals representing initiated alarms. The processor 102 may be further operable to convert the signals into an appropriate format for the processor to use and/or for a database 104 to store therein. In example embodiments wherein the alarm-based entity comprises two or more different alarm systems that generate different alarm signals, formats, standards, priorities, or the like, the processor is operable to normalize the different alarm signals so as to enable consistent managing of the alarms. The processor 102 may be in communication with, among other things, one or more networks 110, one or more graphical displays 106, one or more databases 104, and one or more interfaces 108. In example embodiments, alarm signals are communicable to and/or from the interface(s) 108 through wires and/or wirelessly, and such communication may be through the network(s) 110. The network 110 may comprise an internet-based network, or the like, and communication through the network 110 to and from the processor 102 may be performable in a secure manner, such as by using encryption, or the like.

In an example embodiment, a group alarm 210 may be reportable 222 (such as displayable on a graphical display 106) or suppressed 218, 220 from being reported (such as not displayed on the graphical display) as an initiated alarm. A grouping procedure 210 may be operable to report and/or display the group alarm when two or more initiated alarms are identified as being related. As used herein, "report", "reportable", "reporting", "display", "displayable", "displayed", and the like, will be used interchangeably and will refer to providing information to an operator. Initiated alarms may be related when, for example, the alarms comprise a same priority, another related aspect, a user-defined relation, and/or based on the alarm policy 402. Alarms may also be related when the alarms comprise a same required action for an operator to perform upon being initiated. In example embodiments, when two or more initiated alarms comprise the same priority and the same initial operator response, a group alarm 210, being an alarm representing the two or more related initiated alarms, may be displayable on the graphical display 106 and/or a computing device 112. Correspondingly, the two or more related initiated alarms may be removed, suppressed, delayed, or the like, from being displayed on the graphical display. In doing so, the number of initiated alarms displayed to an operator may be substantially reduced in example embodiments. It is to be understood herein that a group alarm may comprise any one or more initiated alarms, including another group alarm, a condition-based alarm, and a reprioritized alarm, and may or may not be suppressed by a suppression procedure.

In an example embodiment, condition-based alarm 212 may be displayable 222 on or suppressed 218, 220 from being displayed on the graphical display 106 as an initiated alarm. A condition-based procedure 212 may be operable to display the condition-based alarm when one or more initiated alarms are identified and one or more event conditions are satisfied. It is recognized herein that condition-based alarms 212 are operable to determine, among other things, one or more situations that may or may not be monitored, measured, and/or determined accurately or at all by alarm sensors. It is to be understood herein that a condition-based alarm may comprise any one or more initiated alarms, including another condition-based alarm, a group alarm, and a reprioritized alarm, and may or may not be suppressed by a suppression procedure.

In an example embodiment, an initiated alarm may be reprioritized 214 prior to being displayable 222 on or suppressed 218, 220 from being displayed on the graphical display 106 as an initiated alarm. A reprioritization procedure 214 may be operable to dynamically change one or more limit settings of an initiated alarm when one or more conditions, such as a reprioritization condition, are met. In this regard, a reprioritization 214 of the alarm may occur since the alarm becomes initiated based on a different limit setting. In another example embodiment, the reprioritization 214 may comprise dynamically changing the priority of one or more limit settings of an alarm when one or more conditions, such as a reprioritization condition, are met. In this regard, a reprioritization 214 of the alarm may occur since the alarm becomes initiated based on a different priority when the limit setting is met. In example embodiments, the reprioritization 214 may also be operable to dynamically change one or more limit settings and one or more priorities of an alarm when one or more reprioritization conditions are met. It is to be understood herein that a reprioritization may be performable on any one or more initiated alarms, including a group alarm, a condition-based alarm, and a previously reprioritized alarm, and may or may not be suppressed by a suppression procedure.

The method may also comprise a static suppression procedure 218a for suppressing one or more alarms that become initiated when one or more shutdown activities occur and/or based on the alarm policy. In applying a static suppression procedure 218a, example embodiments are operable to identify and associate one or more alarms that may become initiated when a shutdown activity occurs. That is, when a shutdown activity is identified, example embodiments are operable to perform suppressing of the identified and associated alarms. In doing so, the number of initiated alarms displayed to an operator may be substantially reduced during shutdown activities. The shutdown activity may be a known or planned shutdown activity, and may include an entire plant shutdown, a partial plant shutdown, one or more process or line shutdowns, one or more equipment shutdowns, and/or parts thereof. It is to be understood herein that a static suppression procedure may be performable on any one or more initiated alarms, including a group alarm, a condition-based alarm, and a reprioritized alarm.

A dynamic suppression procedure 218b, 300, as illustrated in FIG. 3, may also be provided when managing a plurality of initiated alarms. In example embodiments, a dynamic suppression procedure 218b, 300 may comprise suppressing one or more triggered alarms from among initiated alarms 302 when a trigger alarm is initiated and identified 306 as a trigger alarm. In operation, after a trigger alarm is identified 306, a set of expected alarms 308 that are expected to be triggered by the trigger alarms may be retrievable from a database 104, such as the alarm database, and identified. A set of triggered alarms 310 may then be identified by determining, among other things, which of the initiated alarms occurring subsequent to the trigger alarm matches an alarm in the set of expected alarms 308. Example embodiments may also be operable to identify a set of untriggered alarms 312, which may include alarms matching an alarm in the set of expected alarms 308 but not subsequently received as an initiated alarm after the trigger alarm. The dynamic suppression procedure 218b, 300 may then be operable to suppress 314 the set of triggered alarms. Furthermore, the trigger alarm may be displayable 318 on the graphical display as an initiated alarm. Furthermore, a fault alarm 320, which may include an alarm representing a positive identification of a set of untriggered alarms, may also be displayable on the graphical display 106 as an initiated alarm. In example embodiments, the dynamic suppression procedure 218b, 300 may be operable to suppress 314 the set of triggered alarms 310 during a trigger timer having a predetermined duration. In situations wherein a trigger or triggered alarm is initiated after the trigger timer, the dynamic suppression procedure 218b, 300 may begin again by first identifying a trigger alarm 306, retrieving and identifying a set of expected alarms 308, determining a set of triggered alarms 310, identifying a set of untriggered alarms 312, suppressing the set of triggered alarms 314, and displaying the trigger alarm 318 and any fault alarms 320. In implementing the dynamic suppression procedure 218b, 300, it is recognized herein that the number of initiated alarms displayed to an operator may be substantially reduced in example embodiments. It is to be understood that a prioritization step 304 may be performable prior to suppressing the initiated alarm in example embodiments. It is also to be understood herein that a dynamic suppression procedure may be performable on any one or more initiated alarms, including a group alarm, a condition-based alarm, and a reprioritized alarm.

A transitory suppression procedure 218c may be operable to identify and suppress transitory alarms in example embodiments. In doing so, the number of initiated alarms displayed to an operator may be substantially reduced in example embodiments. It is to be understood herein that a transitory suppression procedure may be performable on any one or more initiated alarms, including a group alarm, a condition-based alarm, and a reprioritized alarm.

In an example embodiment, after suppressing 218 suppressible alarms, as described above and herein, a reporting procedure 222 may be operable to display, among other things, unsuppressed initiated alarms on the graphical display 106. It is recognized herein that displaying mostly or only unsuppressed initiated alarms enables the number of relevant initiated alarms displayed on the graphical display 106 to be substantially reduced. In example embodiments, the unsuppressed initiated alarms 222 are displayable on the graphical display 106 based on priority of the alarm. The displayed alarms may also be displayed based on other characteristics, as described above and herein, including whether the initiated alarm is a process alarm, a diagnostic (or system) alarm, a group alarm 210, a condition-based alarm 212, a trigger alarm 218b, a reprioritized alarm 214, and the like. As such, in displaying initiated alarms based on, for example, process alarms and diagnostic alarms, plant operators viewing operator terminals 106, 112 of the alarm management system may be shown alarms comprising process alarms, and system engineers viewing dedicated maintenance terminals 106, 112 of the alarm management system may be shown alarms comprising diagnostic alarms. It is to be understood herein that the reporting procedure may report any one or more initiated alarms, including a group alarm, a condition-based alarm, and a reprioritized alarm. The reporting procedure may also be operable to enable an operator to learn more about suppressed alarms.

In respect to the reporting procedure 220, 222 described above and herein, an operator (or system engineer) may be further operable to select an initiated alarm to further identify, configure (or reconfigure), assess, analyze, understand, provide further reporting, reprioritize, group, create new alarms (such as event alarms), and/or handle and/or resolve situations, including problems indicated by the initiated alarm. In example embodiments, the selecting may include using a peripheral input device, such as a mouse or touchpad, to click or double-click on the displayed initiated alarm and/or an icon representing the initiated alarm. The selecting may also include, in embodiments comprising a touchscreen display, touching the displayed initiated alarm and/or an icon representing the initiated alarm. Upon selecting an initiated alarm, a window, such as an alarm narrative window, may be opened to display, among other things, details of the alarm. In example embodiments, the window may display information comprising one or more of the alarm name, associated site/plant/unit/area/panel/equipment/etc., location of the alarm in the organization, map of the location of the alarm, alarm type, alarm limit setting, units of measure, purpose of the alarm, consequence of no operator action, severity, operator response time, required operator action (or initial operator response), priority (or priorities) of the alarm, selected priority or priorities of the alarm, safeguards for the alarm (such as pre-alarms and escalation), reprioritization procedures and conditions, static suppression procedures and pertinent shutdown activities, dynamic suppression procedures and other initiated triggered alarms suppressed by the alarm, group or grouped alarm details and conditions, transient suppression procedures, event alarm details and conditions, dead band value or values, significant operating conditions, delay, auto acknowledge, and the like.

In example embodiments, one or more of the methods described above and herein may be in the form of instructions embodied in a non-transitory computer-readable medium that, when executed on a computing device 102, such as one or more of those described above and herein, may cause the computing device 102 and/or another remote computing device 112 in communication with the computing device 102 to perform one or more of the methods described above and herein.

An alarm management processor 102, such as a computer server, may be operable to receive initiated alarms in an alarm-based environment of an alarm-based entity. The alarm processor 102 may be operable to perform one or more of the above methods of configuring and/or managing a plurality of initiated alarms, including prioritizing alarms 204, initiating a group alarm 210, initiating a condition-based alarm 212, reprioritizing 214 an initiated alarm, performing static suppression 218a of initiated alarms, performing dynamic suppression 218b, 300 of initiated alarms, performing suppression of transient alarms 216, performing suppression of fleeting alarms, displaying unsuppressed alarms 222, including unsuppressed initiated alarms, unsuppressed group alarms, unsuppressed event alarms, unsuppressed reprioritized alarms, unsuppressed pre-alarms, unsuppressed trigger alarms, removing unnecessary default or pre-configured alarms, re-configuring dead band values for an initiated alarm, and the like.

A remote computing device 112, such as a network-connected desktop computer, laptop computer, and/or mobile device (such as a tablet, PDA, mobile phone, or the like), may be operable to communicate with the alarm processor 102. In example embodiments, the remote computing device 112 may be assigned certain privileges based on the user. For example, a desktop or laptop computer 112 for an operator in an operations room may be granted full or most privileges, which may include most or all of the functionalities of the alarm processor 102. A mobile device 112, such as a smart phone (ex. iPhone or Android-based phone), of a supervisor or manager of operations may also be granted full or most privileges. A mobile device 112 of a system engineer, on the other hand, may only be granted viewing-only privileges.

Assessing an Overall Performance of an Alarm Management System

Figure 5:
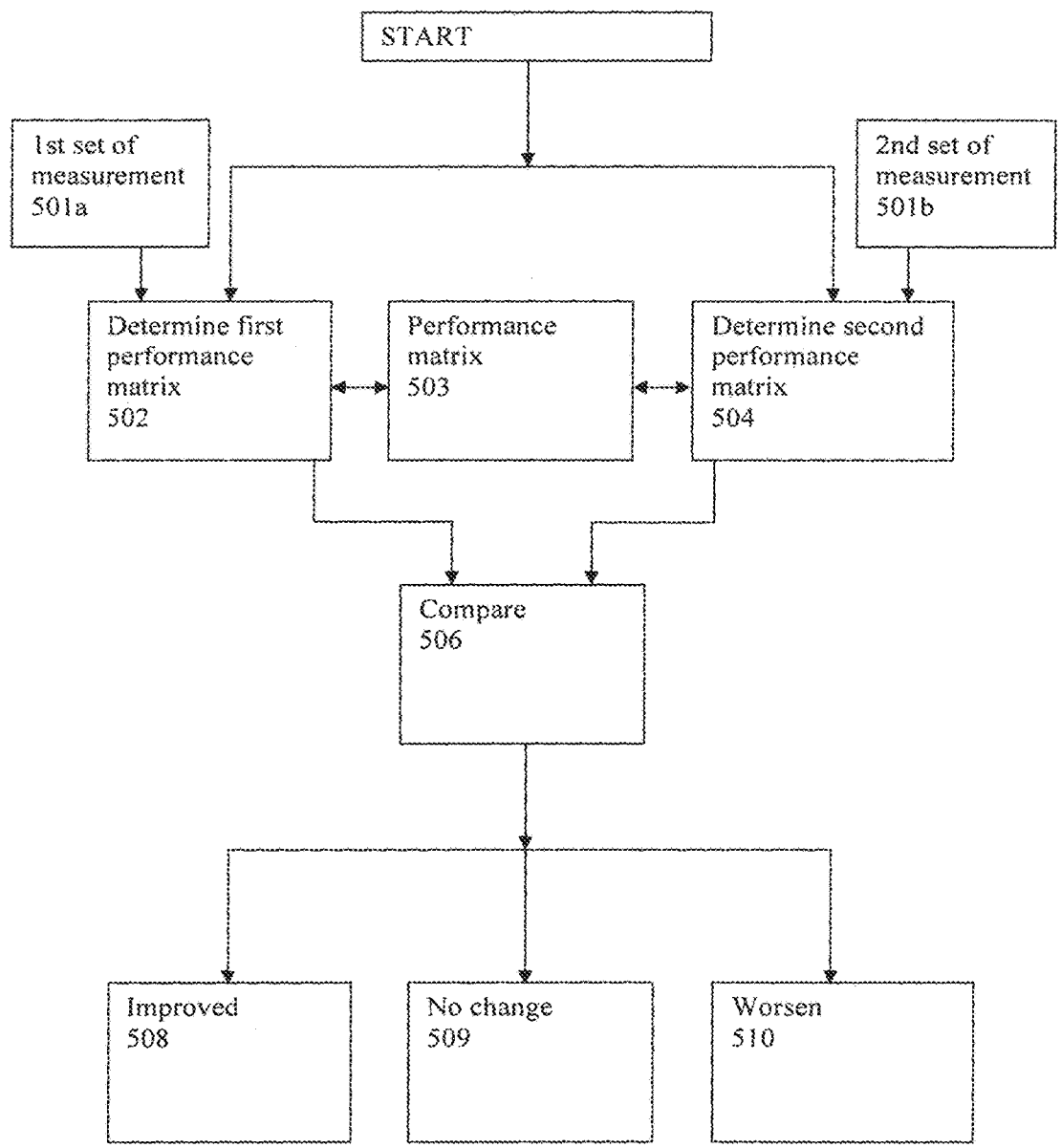
FIG. 5 is an exemplary embodiment of a method of assessing an overall performance of a system comprising a plurality of alarms initiated by a plurality of alarm sensors.
Figure 6:
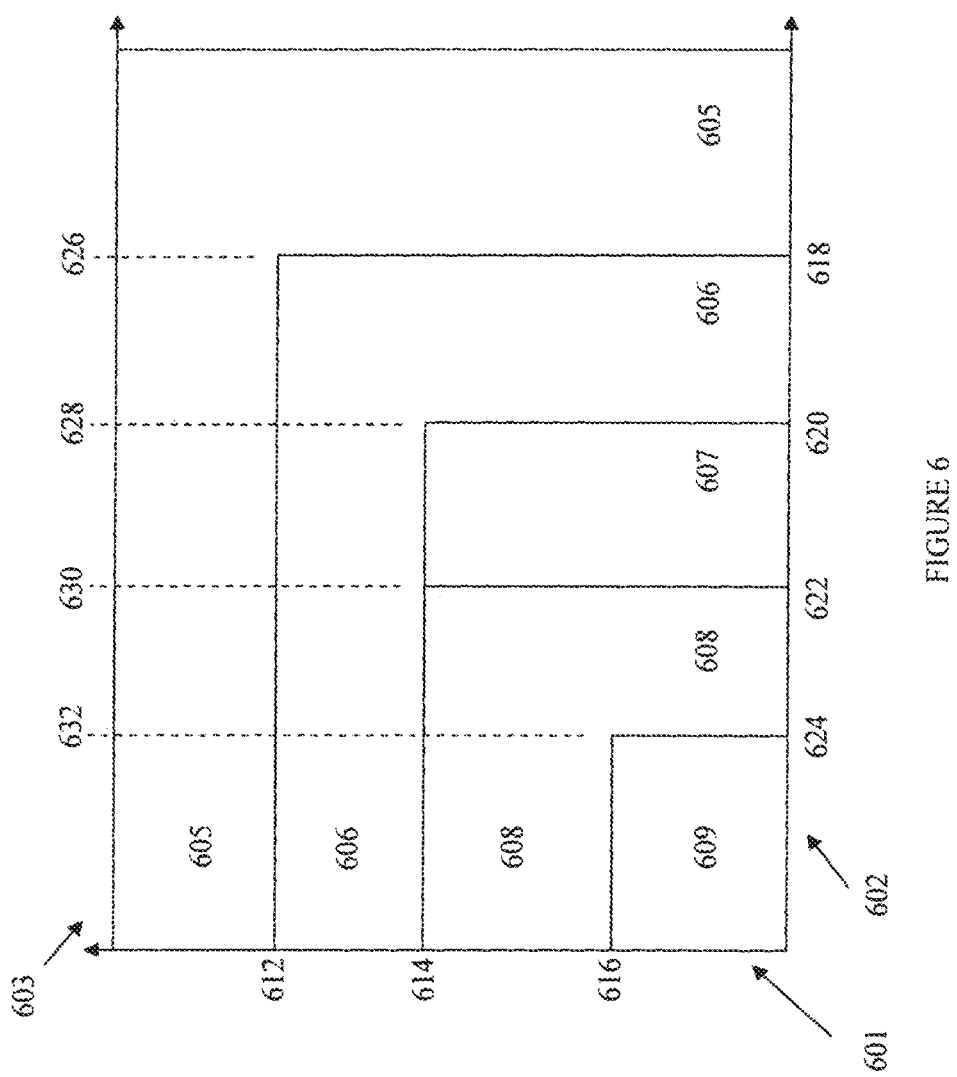
FIG. 6 is an exemplary embodiment of a method of assessing a level of performance for a system comprising a plurality of alarms initiated by a plurality of alarm sensors.

An example embodiment of assessing an overall performance of an alarm management system is illustrated in FIGS. 5 and 6. Example embodiments for assessing an overall performance of an alarm management system may include a scheduled periodic routine of assessing the entire alarm management system and/or one or more particular operators, operator teams, operator shifts, and the like, for every fixed duration of time, such as six months. Example embodiments may also include assessing an overall performance of an alarm management system after a substantive event. A substantive event may include one or more of an upgrade or replacement of a part or all of a DCS, an upgrade or replacement of a part or all of an alarm management system, a new or revision of a part or all of an alarm policy, a new or revision of a part or all of an alarm prioritization matrix, and a new or revision of a part or all of an industry standard.

In assessing an overall performance of an alarm management system, example embodiments comprise determining a first performance level 502 of the system based on a performance matrix 503 and a first set of system measurements 501a. The first set of system measurements 501a may comprise a first average alarm rate for a first time period, a first threshold percentage for the first time period, and a first maximum alarm rate occurring within the first time period. The first threshold percentage is a percentage of time in the first time period that an average alarm rate is greater than a predetermined threshold alarm rate. Thereafter, the assessing comprises determining a second performance level 504 of the system based on the performance matrix 503 and a second set of system measurements 501b. The second set of system measurements 501b comprises a second average alarm rate for a second time period, a second threshold percentage for the second time period, and a second maximum alarm rate occurring within the second time period. Similarly, the second threshold percentage is a percentage of time in the second time period that an average alarm rate is greater than the predetermined threshold alarm rate.

Once the first performance level 502 of the system and the second performance level 504 of the system are determined, an example embodiment is operable to compare 506 the first performance level 502 to the second performance level 504. An improvement 508 in overall performance of the system is assessed when the second performance level 504 is better than the first performance level 502. In a similar manner, a deterioration or worsening 510 in overall performance of the system is assessed when the second performance level 504 is not as good as the first performance level 502. No change 509 in overall performance of the system is assessed when the second performance level 504 is the same as the first performance level 502.

As further illustrated in FIG. 6, the performance matrix 600 is operable to determine an overall performance level of the system based on a first parameter 601 being a first or second average alarm rate, a second parameter being a first or second maximum alarm rate, and a third parameter being a first or second percentage of time that an average alarm rate is greater than a threshold rate. More specifically, the performance matrix 600 determines an overall performance level of the system as being, for example, a first level 605, a second level 606, a third level 607, a fourth level 608, or a fifth level 609. In this regard, the fifth level 609 is indicative of a better overall performance of the system than the fourth level 608. In a similar manner, the fourth level 608 is indicative of a better overall performance of the system than the third level 607, the third level 607 is indicative of a better overall performance of the system than the second level 606, and the second level 606 is indicative of a better overall performance of the system than the first level 605. It is to be understood herein that example embodiments of the performance matrix may include more or less than five levels. Furthermore, it is to be understood herein that each level may comprise a range that is the same, such as a range of 10 values, or a range that is different, such as a logarithmic or exponential scale.

In an example embodiment, the first level 605 is achievable when the first parameter 601 is greater or equal to a first parameter first value 612. The first level 605 is also achievable when the second parameter 602 is greater than or equal to a second parameter first value 618. The first level 605 is also achievable when the third parameter 603 is greater than or equal to a third parameter first value 626.

In an example embodiment, the second level 606 is achievable when the first parameter 601 is between the first parameter first value 612 and a first parameter second value 614, and the second parameter 602 is less than or equal to a second parameter second value 620. The second level 606 is also achievable when the first parameter 601 is between the first parameter first value 612 and the first parameter second value 614, and the third parameter 603 is less than or equal to a third parameter second value 628. The second level 606 is also achievable when the first parameter 601 is less than the first parameter first value 612 and the third parameter 603 is between the third parameter first value 626 and the third parameter second value 628. The second level 606 is also achievable when the first parameter 601 is less than the first parameter first value 612 and the second parameter 602 is between the second parameter first value 618 and the second parameter second value 620.

In an example embodiment, the third level 607 is achievable when the first parameter 601 is less than the first parameter second value 614 and the third parameter 603 is between the third parameter second value 628 and a third parameter third value 630. The third level 607 is also achievable when the first parameter 601 is less than the first parameter second value 620 and the second parameter 602 is between the second parameter second value 620 and a second parameter third value 622.

In an example embodiment, the fourth level 608 is achievable when the first parameter 601 is between the first parameter second value 614 and a first parameter third value 616 and the second parameter 602 is less than a second parameter fourth value 624. The fourth level 608 is also achievable when the first parameter 601 is between the first parameter second value 614 and the first parameter third value 616 and the third parameter 603 is less than or equal to a third parameter fourth value 632. The fourth level 608 is also achievable when the first parameter 601 is less than the first parameter second value 614 and the third parameter 603 is between the third parameter third value 630 and the third parameter fourth value 632. The fourth level 608 is also achievable when the first parameter 601 is less than the first parameter second value 614 and the second parameter 602 is between the second parameter third value 622 and the second parameter fourth value 624.

In an example embodiment, the fifth level 609 is achievable when the first parameter 601 is less than the first parameter third value 616 and the third parameter 603 is less than the third parameter fourth value 632. The fifth level 609 is also achievable when the first parameter 601 is less than the first parameter third value 616 and the second parameter 602 is less than the second parameter fourth value 624.

An example embodiment for assessing an overall performance level of a system, as described above and herein, comprises the first parameter being an average alarm rate per 10 minutes (examples include average alarm rate per panel and/or per operator), the second parameter being a maximum alarm rate for any 10 minute period in the first and second time period, and the third parameter being a percentage of time that alarm rates are outside of an acceptability target (examples include percentage of time an alarm rate is outside of 1 alarm per panel and/or per operator per 10 minutes). In an example embodiment, the first level may be indicative of system consistently having an overload of alarms, the second level may be indicative of a reactive system, the third level may be indicative of a stable system, the fourth level may be indicative of a robust system, and the fifth level may be indicative of a predictive system.

In an example embodiment, the first parameter first value may be set as a value between 40 and 60, the first parameter second value may be set as a value between 8 and 12, and the first parameter third value may be set as a value between 0.8 and 1.2. Furthermore, the second parameter first value may be set as a value between 800 and 1,200, the second parameter second value may be set as a value between 400 and 600, the second parameter third value may be set as a value between 80 and 120, and the second parameter fourth value may be set as a value between 8 and 12. Furthermore, the third parameter first value may be set as a value between 40% and 60%, the third parameter second value may be set as a value between 20% and 30%, the third parameter third value may be set as a value between 4% and 6%, and the third parameter fourth value may be set as a value between 0.8% and 1.2%.

In another example embodiment, the first parameter first value may be set as a value of 50, the first parameter second value may be set as a value of 10, and the first parameter third value may be set as a value of 1. Furthermore, the second parameter first value may be set as a value of 1,000, the second parameter second value may be set as a value of 500, the second parameter third value may be set as a value of 100, and the second parameter fourth value may be set as a value of 10. Furthermore, the third parameter first value may be set as a value of 50%, the third parameter second value may be set as a value of 25%, the third parameter third value may be set as a value of 5%, and the third parameter fourth value may be set as a value of 1%.

It is to be understood herein that there may be situations wherein a first and/or second set of measurements, which may comprise the first parameter, the second parameter, and the third parameter, are used in assessing an overall performance of a system, and the assessing, such as the methods described in FIGS. 5 and 6, result in more than one determined level of the system. In such situations, the overall performance level of the system will be the lower of the more than one determined level. For example, if the first parameter value falls in a third level 607, the second parameter value falls in a third level 607, but the third parameter value falls in a second level 608, then the overall performance level of the system will be the lower level, or the third level 607.

Communication between and/or within computing devices can be in any form, including a communication network between connected devices and any other network elements, and may also represent a collection of devices or virtual machines operable to provide cloud computing services to users. In an embodiment, the above-mentioned devices can also be in direct communication with one or more user computers, equipment, instruments, and/or other network elements. Communication between the above devices can include routers, hubs, switches, firewalls, content switches, gateways, call controllers, and/or any other suitable components in any suitable form or arrangement. Communication between the above devices can include, in whole or in part, one or more secured and/or encrypted Virtual Private Networks (VPNs) operable to couple one or more of the devices together by operating or communicating over elements of a public or external communication network. In general, communication between the devices can include any combination of public or private communication equipment such as elements of the public switched telephone network (PSTN), a global computer network such as the internet, an intranet, a local area network (LAN), a wide area network (WAN), or other appropriate communication equipment. In an embodiment, the above devices may communicate through peer-to-peer (P2P) communications over the network. In some embodiments, a communication network might not be used at all if the computing devices are located on the same device.

It is to be understood herein that computing devices can be the same computing device and/or two or more computing devices operating separately or in communication with each other, and computing devices are also operable to input alarm-related information into alarm databases.

As used herein, the terms "computing device", "server", and "processor" can include computing devices, can be a virtual machine, computer, mobile computing device, node, instance, host, or device in a communication network or networked computing environment. Also used herein, a communication network or networked computing environment is a collection of devices connected by communication channels that facilitate communication between devices and allow devices to share resources. Also as used herein, one or more of said computing devices can be a device deployed to execute a program, including those that operate as a socket listener, and may include software instances.

Furthermore, computing device, which can include computing devices described herein, can encompass any type of computing resource for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof. Examples of computing devices include general-purpose computers and laptops, network nodes, servers, tablets, handheld devices, PDAs, mobile phones, virtual machines, peripheral devices such as a keyboard, mouse, and/or touch-screen, sensors (such as those that measure, count, or keep track of production, time, temperature, pressure, etc.), databases, networks, etc.

While various embodiments in accordance with the disclosed principles have been described above, it should be understood that they have been presented by way of example only, and are not limiting. Thus, the breadth and scope of example embodiments described herein should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

For example, a communication network or networked computing environment may include but is not limited to computing grid systems, distributed computing environments, cloud computing environment, etc. Such communication networks or networked computing environments include hardware and software infrastructures configured to form a virtual organization comprised of multiple resources that may be in geographically disperse locations.

While communication protocols may not be expressly described herein, the coverage of the present application and any patents issuing therefrom can extend to one or more communication protocols.

Various terms used herein have special meanings within the present technical field. Whether a particular term should be construed as such a "term of art" depends on the context in which that term is used. "Connected to," "in communication with," "associated with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under various patent regulations and practice, or otherwise to provide organizational cues. These headings shall not limit or characterize the embodiments set out in any claims that may issue from this disclosure. Specifically, a description of a technology in the "Background" is not to be construed as an admission that technology is prior art to any embodiments in this disclosure. Furthermore, any reference in this disclosure to "invention" in the singular should not be used to argue that there is only a single point of novelty in this disclosure. Multiple inventions may be set forth according to the limitations of the claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A method for managing a plurality of alarms initiated by a plurality of alarm sensors, the method comprising:
    receiving, by a processor, a plurality of initiated alarms;
    prioritizing, by the processor, one or more of the initiated alarms;
    processing, by the processor, one or more of the prioritized initiated alarms based on a reprioritization condition;
    responsive to a determination that one or more of the processed prioritized initiated alarms satisfy the reprioritization condition, reprioritizing, by the processor, the one or more processed prioritized initiated alarms that satisfy the reprioritization condition, the reprioritizing including dynamically changing one or more limit settings for the one or more processed prioritized initiated alarms; and
    providing information pertaining to the one or more reprioritized alarms.

2. The method of claim 1, further comprising creating a group alarm when two or more related initiated alarms are received, wherein the related initiated alarms include the same priority and a same initial operator response.

3. The method of claim 1, further comprising suppressing one or more of the initiated alarms.

4. The method of claim 1, wherein the reprioritized alarm includes a group alarm.

5. The method of claim 1, wherein the reprioritized alarm includes a condition-based alarm.

6. A system for managing a plurality of alarms initiated by a plurality of alarm sensors, the system comprising:
    a network;
    a graphical display;
    an interface operable to receive signals representing initiated alarms;
    a storage device including a database, the database configurable to store alarm information;
    a processor in communication with the graphical display, the interface, the storage device, and the network, the processor operable to:
      receive, from the interface via the network, a plurality of initiated alarms;
      prioritize one or more of the initiated alarms;
      process one or more of the prioritized initiated alarms based on a reprioritization condition;
      responsive to a determination that one or more of the processed prioritized initiated alarms satisfy the reprioritization condition, reprioritize the one or more processed prioritized initiated alarms that satisfy the reprioritization condition, the reprioritizing including dynamically changing one or more limit settings for the one or more processed prioritized initiated alarms;
    display, on the graphical display, information pertaining to one or more of the reprioritized alarms.

7. The system of claim 6, further comprising a computing device in communication with the processor through the network, the computing device comprising logic operable to receive and display initiated alarms received at the processor.

8. Logic for managing a plurality of alarms initiated by a plurality of alarm sensors, the logic being embodied in a non-transitory computer-readable medium and, when executed, operable to cause a computing device to perform the steps of:
    prioritizing, by the computing device, one or more initiated alarms;
    processing, by the computing device, one or more of the prioritized initiated alarms based on a reprioritization condition;
    responsive to a determination that one or more of the processed prioritized initiated alarms satisfy the reprioritization condition, reprioritizing, by the computing device, the one or more processed prioritized initiated alarms that satisfy the reprioritization condition, the reprioritizing including dynamically changing one or more limit settings for the one or more processed prioritized initiated alarms;

displaying, on a graphical display in communication with the computing device, information pertaining to one or more of the reprioritized alarms.

9. The method of claim 1, wherein the reprioritizing further includes, after dynamically changing the one or more limit settings for the one or more processed prioritized initiated alarms being reprioritized, performing a prioritizing of the one or more processed prioritized initiated alarms based on the dynamically changed one or more limit settings.

10. The method of claim 1, wherein the information provided pertaining to the reprioritized alarms includes information pertaining to the dynamically changed one or more limit settings and does not include information pertaining to the one or more limit settings that were dynamically changed by the reprioritizing.

11. The method of claim 1, wherein the reprioritizing comprises dynamically changing one or more priorities for the one or more processed prioritized initiated alarms.

12. The method of claim 11, wherein the reprioritizing further includes, after dynamically changing the one or more priorities for the one or more processed prioritized initiated alarms being reprioritized, performing a prioritizing of the one or more processed prioritized initiated alarms based on the dynamically changed one or more priorities.

13. The method of claim 11, wherein the information provided pertaining to the reprioritized alarms includes information pertaining to the dynamically changed one or more priorities and does not include information pertaining to the one or more priorities that were dynamically changed by the reprioritizing.

14. The method of claim 1, wherein the reprioritizing comprises:
dynamically changing one or more limit settings for the one or more processed prioritized initiated alarms; and
dynamically changing one or more priorities for the one or more processed prioritized initiated alarms.

15. The system of claimer 6, wherein the reprioritizing, by the processor, further includes, after dynamically changing the one or more limit settings for the one or more processed prioritized initiated alarms being reprioritized, performing a prioritizing of the one or more processed prioritized initiated alarms based on the dynamically changed one or more limit settings.

16. The system of claimer 6, wherein the information displayed, by the processor on the graphical display, pertaining to the reprioritized alarms includes information pertaining to the dynamically changed one or more limit settings and does not include information pertaining to the one or more limit settings that were dynamically changed by the reprioritizing.

17. The system of claim 6, wherein the reprioritizing, by the processor, comprises dynamically changing one or more priorities for the one or more processed prioritized initiated alarms.

18. The system of claim 17, wherein the reprioritizing, by the processor, further includes, after dynamically changing the one or more priorities for the one or more processed prioritized initiated alarms being reprioritized, performing a prioritizing of the one or more processed prioritized initiated alarms based on the dynamically changed one or more priorities.

19. The system of claim 17, wherein the information displayed, by the processor on the graphical display, pertaining to the reprioritized alarms includes information pertaining to the dynamically changed one or more priorities and does not include information pertaining to the one or more priorities that were dynamically changed by the reprioritizing.

20. The system of claim 6, wherein the reprioritizing, by the processor, comprises:
dynamically changing one or more limit settings for the one or more processed prioritized initiated alarms; and
dynamically changing one or more priorities for the one or more processed prioritized initiated alarms.

21. The logic of claim 8, wherein the reprioritizing further includes, after dynamically changing the one or more limit settings for the one or more processed prioritized initiated alarms being reprioritized, performing a prioritizing of the one or more processed prioritized initiated alarms based on the dynamically changed one or more limit settings.

22. The logic of claim 8, wherein the information displayed on the graphical display pertaining to the reprioritized alarms includes information pertaining to the dynamically changed one or more limit settings and does not include information pertaining to the one or more limit settings that were dynamically changed by the reprioritizing.

23. The logic of claim 8, wherein the reprioritizing comprises dynamically changing one or more priorities for the one or more processed prioritized initiated alarms.

24. The logic of claim 23, wherein the reprioritizing further includes, after dynamically changing the one or more priorities for the one or more processed prioritized initiated alarms being reprioritized, performing a prioritizing of the one or more processed prioritized initiated alarms based on the dynamically changed one or more priorities.

25. The logic of claim 23, wherein the information displayed on the graphical display pertaining to the reprioritized alarms includes information pertaining to the dynamically changed one or more priorities and does not include information pertaining to the one or more priorities that were dynamically changed by the reprioritizing.

26. The logic of claim 8, wherein the reprioritizing comprises:
dynamically changing one or more limit settings for the one or more processed prioritized initiated alarms; and
dynamically changing one or more priorities for the one or more processed prioritized initiated alarms.

* * * * *